US008676424B2

(12) United States Patent
Bartels et al.

(10) Patent No.: US 8,676,424 B2
(45) Date of Patent: Mar. 18, 2014

(54) DRIVE SYSTEM FOR A MOTOR VEHICLE AND METHOD FOR OPERATING SUCH A DRIVE SYSTEM

(71) Applicant: Dr. Ing. H.C.F. Porsche Aktiengesellschaft, Stuttgart (DE)

(72) Inventors: Holger Bartels, Aspach (DE); Dominik Bender, Stuttgart (DE); Christoph Bittner, Friolzheim (DE); Florian Fuhr, Stuttgart (DE); Markus Gantikow, Koenigsbach-Stein (DE); Heiko Mayer, Adelmannsfelden (DE); Tobias Roulet, Altdorf (DE); Nils Sauvlet, Rutesheim (DE); Christian Wiedenbruegge, Bad Wildbad (DE); Stefan Wimmer, Neuhausen/Schellbronn (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/717,747

(22) Filed: Dec. 18, 2012

(65) Prior Publication Data
US 2013/0179017 A1 Jul. 11, 2013

(30) Foreign Application Priority Data
Dec. 19, 2011 (DE) .......................... 10 2011 056 597

(51) Int. Cl.
*B60W 10/06* (2006.01)
(52) U.S. Cl.
USPC ............................................ 701/22; 903/930
(58) Field of Classification Search
USPC .............. 701/22, 78; 180/242, 65.265, 65.21, 180/65.25; 903/903, 909, 914, 918, 919, 903/945–947, 951
See application file for complete search history.

(56) References Cited

U.S. PATENT DOCUMENTS

| | | | |
|---|---|---|---|
| 2002/0030408 A1 | 3/2002 | Niwa et al. | |
| 2010/0161193 A1* | 6/2010 | Piel et al. | 701/78 |
| 2011/0130909 A1* | 6/2011 | Claeys et al. | 701/22 |
| 2013/0035818 A1 | 2/2013 | Meitinger et al. | |

FOREIGN PATENT DOCUMENTS

| | | |
|---|---|---|
| DE | 101 45 157 B4 | 6/2005 |
| DE | 10 2006 030 197 A2 | 1/2008 |
| DE | 10 2009 055 721 A1 | 6/2011 |
| DE | 10 2010 014 971 A1 | 10/2011 |
| WO | WO 2008 037 347 A1 | 4/2008 |
| WO | WO 2011 063 955 A2 | 6/2011 |

\* cited by examiner

*Primary Examiner* — Marthe Marc-Coleman
(74) *Attorney, Agent, or Firm* — Leydig, Voit & Mayer, Ltd.

(57) ABSTRACT

A drive system includes at least two drive devices, at least one of which is electric, that drive at least two drive axles, a power electronics system, an energy storage arrangement, and a control device. The control device includes a drive control module for providing a recuperation limiting value for each electric drive, a recuperation control module for combining the recuperation limiting values to form a maximum recuperation total limiting value, and a brake control module for providing a total braking torque requested by a driver or assistance system, such that it derives a recuperation total torque that is less than the recuperation total limiting value and also derives recuperation partial torques for each electric drive. In the case of a total braking torque that is greater than the recuperation total limiting value, the brake control module generates a hydraulic brake pressure and transmits it to the brake system.

6 Claims, 2 Drawing Sheets

DRIVE SYSTEM FOR A MOTOR VEHICLE AND METHOD FOR OPERATING SUCH A DRIVE SYSTEM

CROSS REFERENCE TO RELATED APPLICATIONS

This application claims priority to German Patent Application No. DE 10 2011 056 597.3, filed Dec. 19, 2011, which is hereby incorporated by reference herein in its entirety.

FIELD

The invention relates to a drive system for a motor vehicle, having at least two axles which are driven independently of one another, at least one electric drive, at least one control device having at least one power electronics system and having an energy storage arrangement.

FIELD

Such a drive system is known, for example, from DE 10 2006 030 197 A1. Furthermore, this document discloses changing the torque distribution on two rotatably mounted shafts, in particular one axle, in order to improve the dynamic stability control of the motor vehicle. Furthermore, basically drive systems for all-wheel motor vehicles are also known which vary or adapt the torque distribution of the two drive axles in order to optimize the vehicle movement dynamics properties of the motor vehicle and optimize the stability control. Even if this adaptation of the torque distribution supplies perfectly satisfactory results in terms of the stability of the vehicle and the vehicle movement dynamics properties, the adaptation of the torque distribution thus also provides a large potential for reducing the consumption and therefore the $CO_2$ emissions, that is to say for improving the driving efficiency. However, this requirement gives rise to an objective which conflicts with the requirement for the highest possible vehicle movement dynamics.

SUMMARY

In an embodiment, the present invention provides a drive system for a motor vehicle includes at least two independent drive devices configured to drive at least two drive axles which are independent of one another. At least one of the drive devices is an electric drive. The drive system also includes a power electronics system, an energy storage arrangement, and a control device. The control device includes a drive control module configured to provide a recuperation limiting value for each electric drive, a recuperation control module configured to combine the recuperation limiting values suitably so as to form a maximum recuperation total limiting value, and a brake control module configured to provide a total braking torque that is requested by a driver or by an assistance system, such that the recuperation control module is configured to derive a recuperation total torque that is less than the recuperation total limiting value and is configured to also derive recuperation partial torques, that are each smaller than or equal to the recuperation limiting values, for each electric drive. In the case of a total braking torque that is greater than the recuperation total limiting value, the brake control module is configured to generate an additional hydraulic brake pressure $p_{hydr.}$ and transmit the additional hydraulic brake pressure $p_{hydr.}$ to a brake system.

BRIEF DESCRIPTION OF THE DRAWINGS

Exemplary embodiments of the present invention are described in more detail below with reference to the drawing, in which.

DETAILED DESCRIPTION

Figure 1:
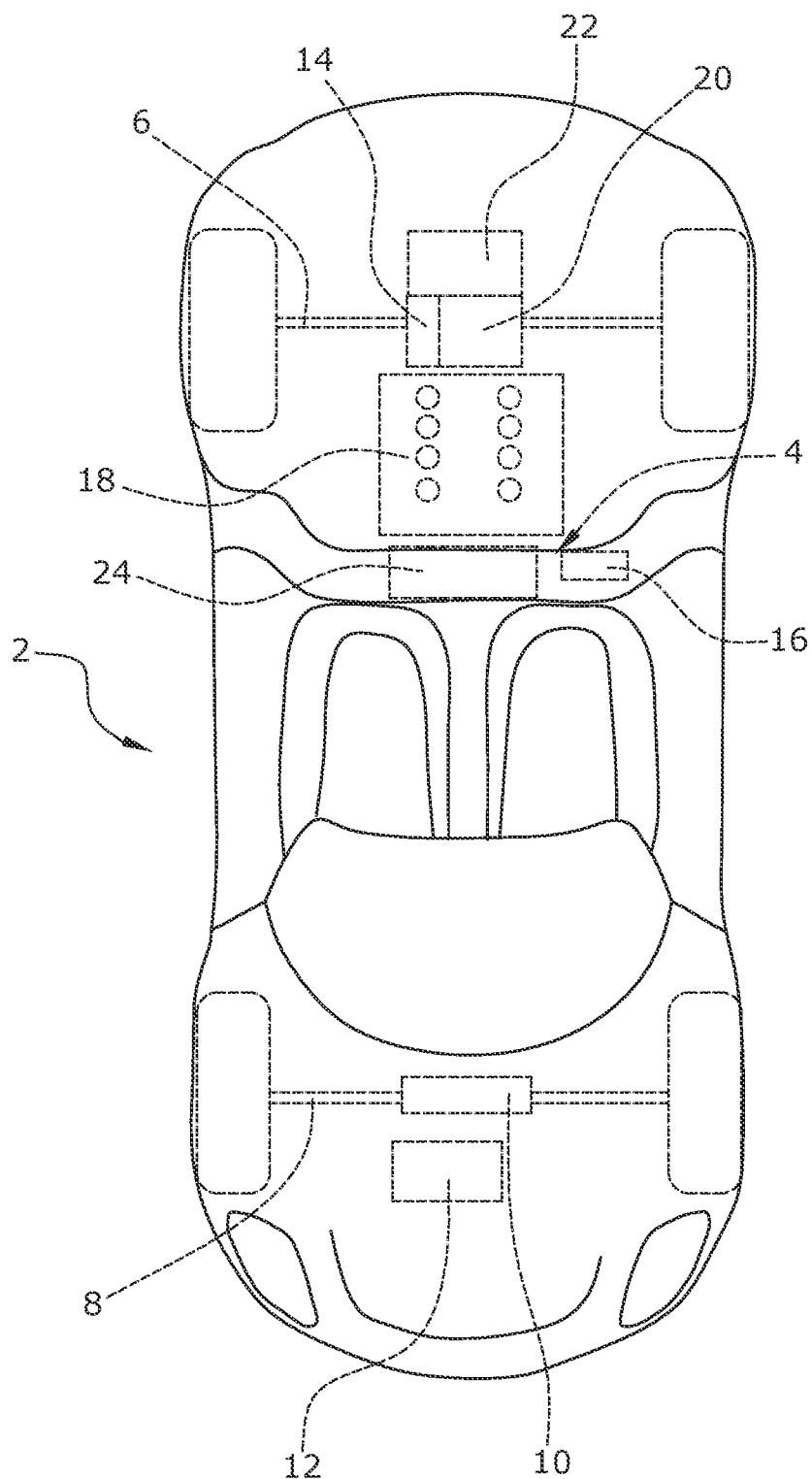
FIG. 1 shows a schematic view of a motor vehicle having the drive system according to the invention.

In an embodiment, the present invention provides a drive system which ensures an energy-efficient drive torque distribution against the background of optimum vehicle movement dynamics conditions and optimum stability control of the motor vehicle.

In an embodiment the present invention provides a control device that has at least one drive control module, a recuperation control module and a brake control module, wherein the drive control module provides a recuperation limiting value for each electric drive, wherein the recuperation control module combines these recuperation limiting values suitably and therefore forms a maximum recuperation total limiting value, wherein the brake control module provides a total braking torque which is requested by the driver, such that the recuperation control module can derive a recuperation total torque which is less than or equal to the recuperation total limiting value, and therefore can also derive recuperation partial torques, which are each smaller than or equal to the recuperation limiting values, for each electric drive, wherein in the case of a total braking torque which is greater than the recuperation total limiting value the brake control module transmits an associated hydraulic brake pressure to a brake system. A drive system which is embodied in such a way makes it possible to use in an optimum way the energy which can be generated during the braking process without limiting or adversely affecting the stability of the wheels and/or of the vehicle.

In order to set a suitable hydraulic brake pressure, a variably adjustable equalization volume can be provided in the brake system in order to absorb a defined volume of a brake hydraulic system. The stability of the vehicle in limiting ranges can also be ensured by virtue of the fact that a traction control module is provided which continuously monitors the stability of the vehicle and, if appropriate, causes the effective drive torque and the recuperation limiting values of the electric drives to be adapted by the recuperation control module.

Furthermore, in an embodiment, the present invention provides a method, wherein in a first step a brake pedal is activated, and the drive control module determines a recuperation limiting value for each electric drive and transmits it to the recuperation control module, in a second step the recuperation control module determines a recuperation total limiting value by suitably combining the recuperation limiting values, in a third step the brake control module determines a total braking torque as a function of the driver's request and transmits it to the recuperation control module, and in a fourth step the recuperation control module determines the recuperation total torque and therefore also the recuperation partial torques for each electric drive, and transmits them to the drive control module, and in a fifth step the brake control module generates a hydraulic brake pressure $p_{hydr.}$ for the event of the total braking torque being greater than the recuperation total limiting value and transmits this hydraulic brake pressure $p_{hydr.}$ to the brake system. In this context it is advantageous if continuous adaptation of the recuperation limiting values is performed by the drive control module against the background of vehicle movement dynamics parameters, of the potentials of the energy storage arrangement, the potentials of the electric drives, etc. In addition, the driver's request can also be partially or completely generated by an assistance function, for example an automatic adaptive cruise controller. As a result, the activation of the brake pedal can partially be dispensed with.

FIG. 1 shows a motor vehicle 2 having a schematically illustrated drive system 4. The motor vehicle 2 has a first drive axle 6 which is embodied as a rear wheel axle, and a second drive axle 8 which is embodied as a front wheel axle. In the front region, an electric drive 10 is provided which is optionally connected to the front wheel axle 8 via a transmission (not illustrated in more detail). Furthermore, in the front region a power electronics system 12 is arranged which is connected as a second power electronics system 14 in the rear region to a control device 16 in a known fashion in order to actuate the respective drive devices. Arranged in the rear region of the motor vehicle 2 are, in addition to the already mentioned power electronics system 14 and the control device 16, an internal combustion engine 18 and a second electric drive 20 which are connected in a known fashion so as to transmit drive via a double clutch transmission 22 to the first drive axle 6 which is embodied as a rear wheel axle. Furthermore, for example in the rear region an energy storage arrangement 24 is provided which is embodied in the present exemplary embodiment as a lithium ion battery pack. However, it should be clear that other energy storage arrangements, such as for example flywheel arrangements can also be provided. The drive system 4 according to the invention then provides, as is described with the aid of FIG. 2, for an optimum energy-efficient drive torque distribution to be carried out against the background of vehicle movement dynamics limiting values.

Figure 2:
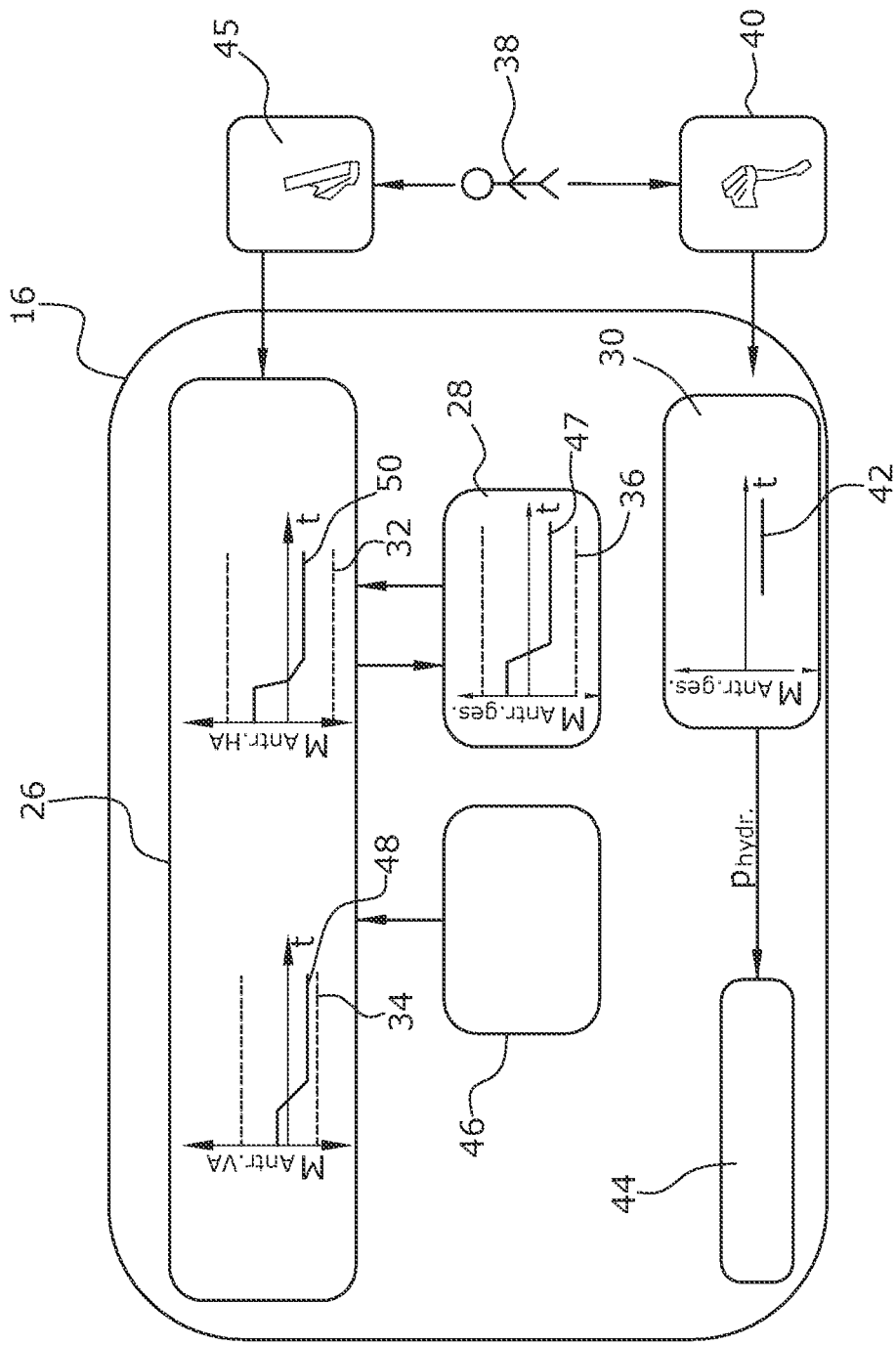
FIG. 2 shows a block circuit diagram of a control device of the drive system according to the invention.

FIG. 2 shows a block circuit diagram having control modules of the control device 16. It is to be noted that the term control module does not necessarily include a closed-loop control system but can of course also describe a simple open-loop control system. In addition to a multiplicity of control modules which can be provided in the control device 16, three control modules are relevant for the present invention. For this purpose, the control device 16 has, in particular, a drive control module 26, a recuperation control module 28 and a brake control module 30. The drive control module 26 provides here a recuperation limiting value 32, 34 for each electric drive 20, 6. The recuperation control module 28 suitably combines these recuperation limiting values 32, 34 while taking into account vehicle movement dynamics peripheral conditions, wherein they are, for example, summed, and said recuperation control module 28 therefore forms a recuperation total limiting value 36. The brake control module 30 provides a total braking torque 42 which is requested by a driver 38 by means of a brake pedal 40 or by means of an assistance system. In the event of the total braking torque 42 which is requested by the driver 38 being greater than a recuperation total limiting value 36, the brake control module 30 generates an additional hydraulic brake pressure $p_{hydraulic}$ and transmits it to a brake system 44. However, in the present case the total braking torque 42 is smaller, with the result that the braking process can take place completely by means of recuperation.

A traction control module 46 which continuously monitors the stability of the vehicle and of the individual wheels and, if appropriate, actuates the drive control module 26 in such a way that the drive torques and the recuperation limiting values 32, 34 of the drive axles 6, 8 are adapted is advantageously also provided.

A method for operating such a drive system 4 can then be described as follows. In a drive situation in which the vehicle 2 is moved in the manner of propulsion by means of a gas pedal 45, at a time t1 the brake pedal 40 is activated. In the drive control module 26 minimum and maximum limiting value torques are continuously calculated, wherein in the present application case only the recuperation limiting value 32 is relevant for the electric drive 10, and the recuperation limiting value 34 thereof is relevant for the electric drive 20. These recuperation limiting values 32, 34 are transmitted to the recuperation control module, wherein the recuperation control module 28 transmits a recuperation total limiting value 36. In a third step, the brake control module 30 subsequently determines a total braking torque 42 as a function of the driver's request and transmits it to the recuperation control module. In a fourth step, the brake control module 30 then transmits the recuperation total torque 47 to the recuperation control module 28, wherein said recuperation total torque 47 is smaller than or equal to the recuperation total limiting value 36. The recuperation control module 28 suitably divides the recuperation total torque 47 into recuperation partial torques 48 and 50 of the drives which are independent of one another, that is to say of the two drive axles 6 and 8 in the example of the electric drives 10 and 20. Said recuperation partial torques 48 and 50 are then transmitted to the drive control module 26.

For the event that, as illustrated in the block circuit diagram, the total braking torque 42 is greater than the recuperation total limiting value 36, the brake control module 30 generates a hydraulic pressure $p_{hydr.}$ and transmits it to the brake system 44. In the present embodiment, continuous adaptation of the recuperation limiting values 32, 34 can also be performed by the drive control module 26 against the background of vehicle movement dynamics parameters or the potentials of the energy storage arrangement or of the electric drives. The vehicle movement dynamics parameters are continuously monitored by the traction control module 46 here.

While the invention has been particularly shown and described with reference to preferred embodiments thereof, it will be understood by those skilled in the art that various changes in form and details may be made therein without departing from the spirit and scope of the invention.

What is claimed is:

1. A drive system for a motor vehicle comprising:
   at least two independent drive devices configured to drive at least two drive axles which are independent of one another, at least one of the drive devices being an electric drive;
   a power electronics system;
   an energy storage arrangement; and
   a control device including:
      a drive control module configured to provide a recuperation limiting value for each electric drive,
      a recuperation control module configured to combine the recuperation limiting values suitably so as to form a maximum recuperation total limiting value, and
      a brake control module configured to provide a total braking torque that is requested by a driver or by an assistance system, such that the recuperation control module is configured to derive a recuperation total torque that is less than the recuperation total limiting value and is configured to also derive recuperation partial torques, which are each smaller than or equal to the recuperation limiting values, for each electric drive, wherein in the case of a total braking torque that is greater than the recuperation total limiting value the brake control module is configured to generate an additional hydraulic brake pressure $p_{hydr}$ and transmits the additional hydraulic brake pressure $p_{hydr}$ to a brake system.

2. The drive system as recited in claim 1, wherein the brake system includes a variably adjustable equalization volume so as to absorb a defined volume of a brake hydraulic system.

3. The drive system as recited in claim 2, further comprising a traction control module configured to continuously monitors a stability of the vehicle and, if appropriate, to cause the drive torques and the recuperation limiting values of the electric drives to be adapted by the recuperation control module.

4. The drive system as recited in claim 1, further comprising a traction control module configured to continuously monitors a stability of the vehicle and, if appropriate, to cause the drive torques and the recuperation limiting values of the electric drives to be adapted by the recuperation control module.

5. A method for operating a drive system for a motor vehicle including at least two independent drive devices configured to drive at least two drive axles which are independent of one another, at least one of the drive devices being an electric drive, a power electronics system, an energy storage arrangement, and a control device including a drive control module configured to provide a recuperation limiting value for each electric drive, a recuperation control module configured to combine the recuperation limiting values suitably so as to form a maximum recuperation total limiting value, and a brake control module configured to provide a total braking torque that is requested by a driver or by an assistance system, such that the recuperation control module is configured to derive a recuperation total torque that is less than the recuperation total limiting value and is configured to also derive recuperation partial torques, which are each smaller than or equal to the recuperation limiting values, for each electric drive, wherein in the case of a total braking torque that is greater than the recuperation total limiting value the brake control module is configured to generate an additional hydraulic brake pressure $p_{hydr}$ and transmits the additional hydraulic brake pressure $p_{hydr}$ to a brake system, the method comprising:

in a first step activating a brake pedal, and determining, using the drive control module, the recuperation limiting value for each drive unit and transmitting the recuperation limiting value to the recuperation control module, in a second step determining, using the recuperation control module, the recuperation total limiting value by suitably combining the recuperation limiting values, in a third step determining, using the brake control module, a total braking torque as a function of at least one of the driver's request or of an assistance system and transmitting the total braking torque to the recuperation control module, in a fourth step determining, using the recuperation control module, the recuperation total torque and also the recuperation partial torques for each electric drive, and transmitting them to the drive control module, and in a fifth step generating, using the brake control module, a hydraulic brake pressure $p_{hydr}$ when the total braking torque is greater than the recuperation total limiting value and transmitting this hydraulic brake pressure $p_{hydr}$ to the brake system.

6. The method for operating a drive system as recited in claim 5, further comprising continuously adapting the recuperation limiting values using the drive control module against a background of vehicle movement dynamics parameters of the potential of the energy storage arrangement and the potential of the electric drives.

* * * * *